United States Patent
Nishida et al.

(10) Patent No.: US 9,150,270 B2
(45) Date of Patent: Oct. 6, 2015

(54) SADDLE-RIDE-TYPE VEHICLE

(71) Applicant: HONDA MOTOR CO., LTD., Tokyo (JP)

(72) Inventors: Yoichi Nishida, Wako (JP); Yoshihiro Inoue, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 14/465,125

(22) Filed: Aug. 21, 2014

(65) Prior Publication Data

US 2015/0053495 A1    Feb. 26, 2015

(30) Foreign Application Priority Data

Aug. 26, 2013   (JP) ................. 2013-174280

(51) Int. Cl.
     *B62J 37/00*      (2006.01)
     *F02M 37/00*      (2006.01)
     *F02M 25/08*      (2006.01)
     *B62J 35/00*      (2006.01)

(52) U.S. Cl.
     CPC ...... *B62J 37/00* (2013.01); *B62J 35/00* (2013.01); *F02M 25/0872* (2013.01); *F02M 37/007* (2013.01); *F02M 37/0017* (2013.01); *F02M 37/0082* (2013.01)

(58) Field of Classification Search
     CPC .................................. B62J 35/00; B62J 37/00
     USPC ....................................................... 280/835
     See application file for complete search history.

(56) References Cited

U.S. PATENT DOCUMENTS

| | | | | |
|---|---|---|---|---|
| 5,636,654 | A * | 6/1997 | Helm | 137/15.01 |
| 6,698,468 | B1 * | 3/2004 | Thompson | 141/86 |
| 8,141,672 | B2 * | 3/2012 | Kuramochi et al. | 180/69.4 |
| 8,752,661 | B2 * | 6/2014 | Nagura et al. | 180/69.4 |
| 8,844,666 | B2 * | 9/2014 | Ashida | 180/219 |
| 2008/0169148 | A1 * | 7/2008 | Beiber Hoeve et al. | 180/219 |
| 2009/0322069 | A1 * | 12/2009 | Koike | 280/835 |
| 2011/0100742 | A1 * | 5/2011 | Shibata et al. | 180/219 |
| 2013/0075181 | A1 * | 3/2013 | Ashida | 180/230 |

FOREIGN PATENT DOCUMENTS

| | | |
|---|---|---|
| JP | 3223729 | 8/2001 |
| JP | 2006-001308 | 1/2006 |
| JP | 2011-162062 | 8/2011 |
| WO | 2009/110573 | 9/2009 |

* cited by examiner

*Primary Examiner* — Kevin Hurley
(74) *Attorney, Agent, or Firm* — Rankin, Hill & Clark LLP

(57) ABSTRACT

A fuel tank from which fuel is supplied to an engine includes: overhang portions that project outward from left and right main frames in the vehicle width direction; and fuel pipes that pass the inside of the fuel tank from an area in the vicinity of a fuel filler port, and extend downward from the overhang portions arranged outside the pair of main frames in the vehicle width direction. The fuel pipes are constituted of a drain pipe through which spilled filling fuel or rain water collected around the fuel filler port is discharged to the outside of the fuel tank, and a breather pipe which makes the inside of the fuel tank and atmosphere communicate with each other.

20 Claims, 10 Drawing Sheets

SADDLE-RIDE-TYPE VEHICLE

BACKGROUND OF THE INVENTION

1. Field of the Invention

The present invention relates to an improvement of the arrangement structure of a fuel pipe provided to a saddle-ride-type vehicle.

2. Description of Related Art

In a saddle-ride-type vehicle, a fuel pipe extends from a fuel tank. Various proposals have been made with respect to the arrangement structure of such a fuel pipe (see Japanese Patent No. 3223729 (FIG. 1), for example).

As shown in FIG. 1 of Japanese Patent No. 3223729, in the inside of a fuel tank (2) (numeral with a parenthesis indicating a symbol described in Japanese Patent No. 3223729, the same definition being applicable hereinafter), a breather pipe (44) that leads an evaporated gas to the outside from an upper space of the fuel tank (2) (hereinafter referred to as "fuel pipe (44)") extends rearward in the longitudinal direction of a vehicle, and a lower end opening portion (44a) of the breather pipe (44) projects outward in the rearward direction from a rear surface (2a) of the fuel tank (2). A hose (66) is connected to the lower end opening portion (44a), the hose (66) extends rearward in the longitudinal direction of the vehicle and, further, extends rearward in the longitudinal direction of the vehicle through between a pair of left and right main frames (12, 12), and is connected to a canister (4) by way of a rollover valve (6).

In the vehicle described in Japanese Patent No. 3223729, the lower end opening portion (44a) of the fuel pipe (44) and the hose (66) are arranged between the left and right main frames (12, 12). Since a large number of other parts are also arranged between the left and right main frames (12, 12), there is still room for improvement in operability relating to mounting and removal of the fuel tank.

SUMMARY OF THE INVENTION

It is an object of the invention to provide a technique for enhancing detachability of a fuel pipe extending from a fuel tank in a saddle-ride-type vehicle.

In accordance with one aspect of the invention, in a saddle-ride-type vehicle where the vehicle includes a head pipe which steerably supports a front wheel and left and right main frames that extend obliquely in the downward and rearward direction from the head pipe, an engine is supported on lower sides of the left and right main frames, a vehicle body frame that supports a seat on which a rider is seated in a straddling manner, and a fuel tank that is arranged above the vehicle body frame and supplies fuel to the engine are provided behind and above the engine, the fuel tank includes overhang portions that project outward from the left and right main frames in the vehicle width direction, and a fuel pipe that passes the inside of the fuel tank from an area in the vicinity of a fuel filler port, and extends downward from the overhang portion.

The fuel tank includes the fuel pipe which passes the inside of the fuel tank from an area in the vicinity of the fuel filler port, and extends to the outside of the fuel tank from the overhang portion of the fuel tank at the position where the fuel pipe is concealed by the vehicle body cover. The overhang portion is arranged outside the main frame and hence, the number of parts disposed there is small compared to other area of vehicle. By extending the fuel pipe from the overhang portion where the number of parts disposed there is small, the operability relating to mounting or removal of the fuel pipe extending to the outside of the fuel tank can be enhanced.

In accordance with another aspect of the invention, the vehicle body covers cover lateral side faces of a vehicle body and extend downward from lateral side faces of the fuel tank, and the fuel pipe extends downward from the overhang portion at a position concealed by the vehicle body cover as viewed in a side view of the vehicle. Since the fuel pipe is arranged in a state where the fuel pipe is concealed by the vehicle body cover, there is no possibility that appearance of the vehicle is impaired.

In accordance with another aspect of the invention, the fuel pipe is a drain pipe through which spilled filling fuel or rain water collected around the fuel filler port is discharged to the outside of the fuel tank. With respect to the drain pipe, in a portion of the drain pipe arranged in the inside of the fuel tank, in the structure where the fuel filler port is arranged on a front side of the fuel tank in the longitudinal direction, compared to the drain pipe which extends rearward in the longitudinal direction of the vehicle from the periphery of the fuel filler port in the fuel tank, a length of the drain pipe extending outward in the vehicle width direction in the fuel tank from the periphery of the fuel filler port can be shortened.

In accordance with another aspect of the invention, the fuel pipe is a breather pipe that allows the inside of the fuel tank communicate with atmosphere. With respect to the breather pipe, in a portion of the breather pipe arranged in the inside of the fuel tank, in the structure where the fuel filler port is arranged on a front side of the fuel tank in the longitudinal direction, compared to the breather pipe which extends rearward in the longitudinal direction of the vehicle from the periphery of the fuel filler port in the fuel tank, a length of the breather pipe extending outward in the vehicle width direction from the periphery of the fuel filler port in the fuel tank can be shortened.

In accordance with another aspect of the invention, the fuel tank includes a canister that prevents discharging of an evaporated fuel into atmosphere, and the canister is connected to a distal end of the breather pipe. With respect to the breather pipe, the breather tube can be easily mounted or removed on a fuel tank side and hence, the degree of freedom in the arrangement of the canister can be largely increased.

In accordance with another aspect of the invention, the vehicle body covers are radiator covers which cover a radiator unit which cools coolant for the engine. For imparting predetermined cooling property to the radiator, the periphery of the radiator cover is a region where the number of parts disposed there is small. Since the fuel pipe is arranged on the periphery of the radiator cover where the number of parts disposed there is small, the detachability of the fuel pipe extending toward the outside of the fuel tank from the overhang portion can be further enhanced.

In accordance with another aspect of the invention, the radiator unit is constituted of side radiator units where cooling air outlets are arranged on side faces of the vehicle body, the side radiator units include air guides which guide a traveling wind taken from a front side of the vehicle to inner side faces of the side radiator units, the radiator covers cover the radiator unit and the air guides, and the drain pipe and/or the breather pipe penetrate/penetrates an area inside the radiator cover and outside the air guide. The drain pipe and/or the breather pipe arranged outside the air guide are/is hardly influenced by heat from the radiator unit. As a result, maintenance property of the pipe is hardly impaired and, at the same time, the pipe is hardly influenced by heat from the radiator unit.

In accordance with another aspect of the invention, the air guide includes an air guide body portion, and a mounting leg portion which extends in a leg shape toward the vehicle body frame from the air guide body portion, and the drain pipe and/or the breather pipe are/is positioned by the vehicle body frame, the air guide body portion and the mounting leg portion as viewed in a plan view. Accordingly, the drain pipe and/or the breather pipe can be positioned without using dedicated guide members or the like, for example, and hence, the increase of the number of parts can be suppressed.

DETAILED DESCRIPTION OF THE INVENTION

Hereinafter, an embodiment of the invention is explained in detail. In the drawings and the embodiment, the directions of "upward", "downward", "frontward", "rearward", "leftward", and "rightward" are directions as viewed from a rider riding on a motorcycle.

The embodiment of the invention is explained by reference to the drawings.

Figure 1:
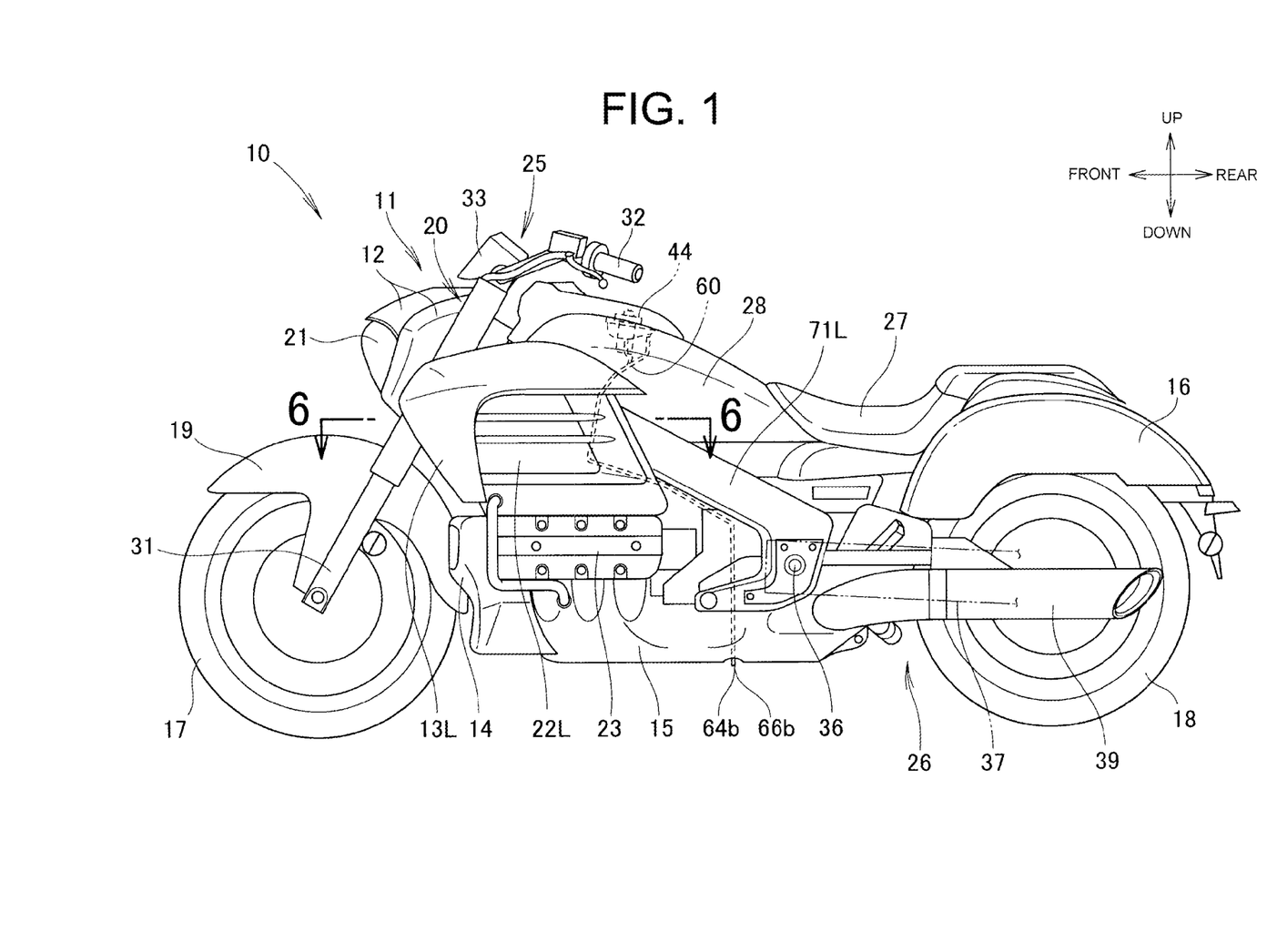
FIG. 1 is a left side view of a motorcycle according to the invention.

As shown in FIG. 1, a motorcycle 10 is covered with a vehicle body cover 11. The vehicle body cover 11 includes, as main components thereof: a front cover 12 that covers the periphery of a headlight 21; radiator covers 13L, 13R (only the radiator cover 13L on a viewer's side shown in the drawing) that extend rearward in the longitudinal direction of a vehicle from lateral sides of the front cover 12, are arranged on lateral sides of a front portion of the vehicle body and cover the peripheries of radiator units 22L, 22R (only the radiator unit 22L on a viewer's side shown in the drawing); an engine center cover 14 that is positioned below the radiator covers 13L, 13R and covers a front side of an engine 23; an under cover 15 that is arranged behind the engine center cover 14 and covers a lower side of the engine; and a rear cover 16 that is arranged behind and above the under cover 15 and covers a rear wheel 18 from lateral sides and from above. A front fender 19 that constitutes a mud guard is arranged above a front wheel 17.

Such a motorcycle 10 includes: a front wheel steering portion 25 that is mounted on a front end of a vehicle body frame 20 and steerably supports the front wheel 17; a rear wheel suspending portion 26 that is mounted on a rear lower portion of the vehicle body frame 20 and swingably supports the rear wheel 18; the engine 23 that is suspended from the vehicle body frame 20 behind the front wheel 17; a seat 27 that is arranged behind and above the engine 23, is supported on the vehicle body frame 20 and on which a rider is seated in a straddling manner; and a fuel tank 28 that is arranged above the vehicle body frame 20 and supplies fuel to the engine 23. The above-mentioned radiator covers 13L, 13R extend downward from lateral side faces of the fuel tank 28 and cover the side faces of the vehicle body.

The motorcycle 10 is a saddle-ride-type vehicle where a rider is seated in a straddling manner on the seat 27 arranged between the front wheel 17 and the rear wheel. The engine 23 mounted on the motorcycle 10 is a horizontally-opposed 6-cylinder engine where a crankshaft extends in the longitudinal direction of the vehicle.

The front wheel steering portion 25 includes, as main components thereof: a front fork 31; a handle bar 32 that is mounted on an upper end of the front fork 31 and with which a rider performs a steering operation; and the front wheel 17 that is rotatably mounted on a lower end of the front fork 31. A headlight 21 is mounted on the front wheel steering portion 25, and a meter unit 33 is mounted on an upper side of a rear portion of the headlight 21.

The rear wheel suspending portion 26 includes: a pivot shaft 36 that is mounted on the vehicle body frame 20; a swing arm 37 that extends rearward from the pivot shaft 36 in the longitudinal direction of the vehicle; and the rear wheel 18 that is rotatably mounted on a rear end of the swing arm 37 and is driven by the engine 23. A muffler 39 extends rearward from the engine 23 in the longitudinal direction of the vehicle.

Figure 2:
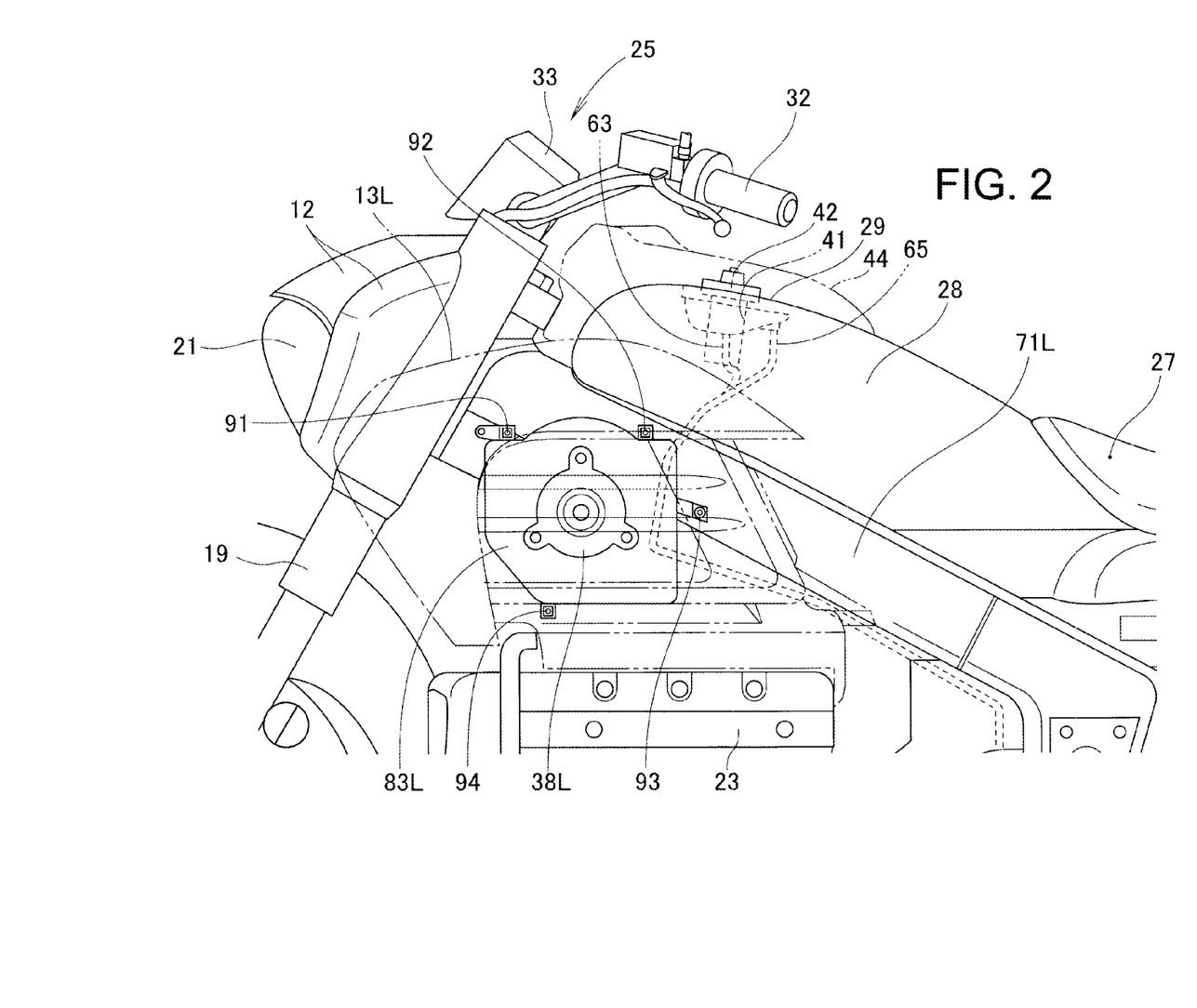
FIG. 2 is an enlarged view of an essential part of the motorcycle shown in FIG. 1.

As shown in FIG. 2, a fuel filler port 41 is formed in an upper face 29 of the fuel tank 28, and the fuel filler port 41 is closed by a cap 42. The upper face 29 of the fuel tank 28 is covered with a top cover 44 above the fuel filler port 41.

Figure 3:
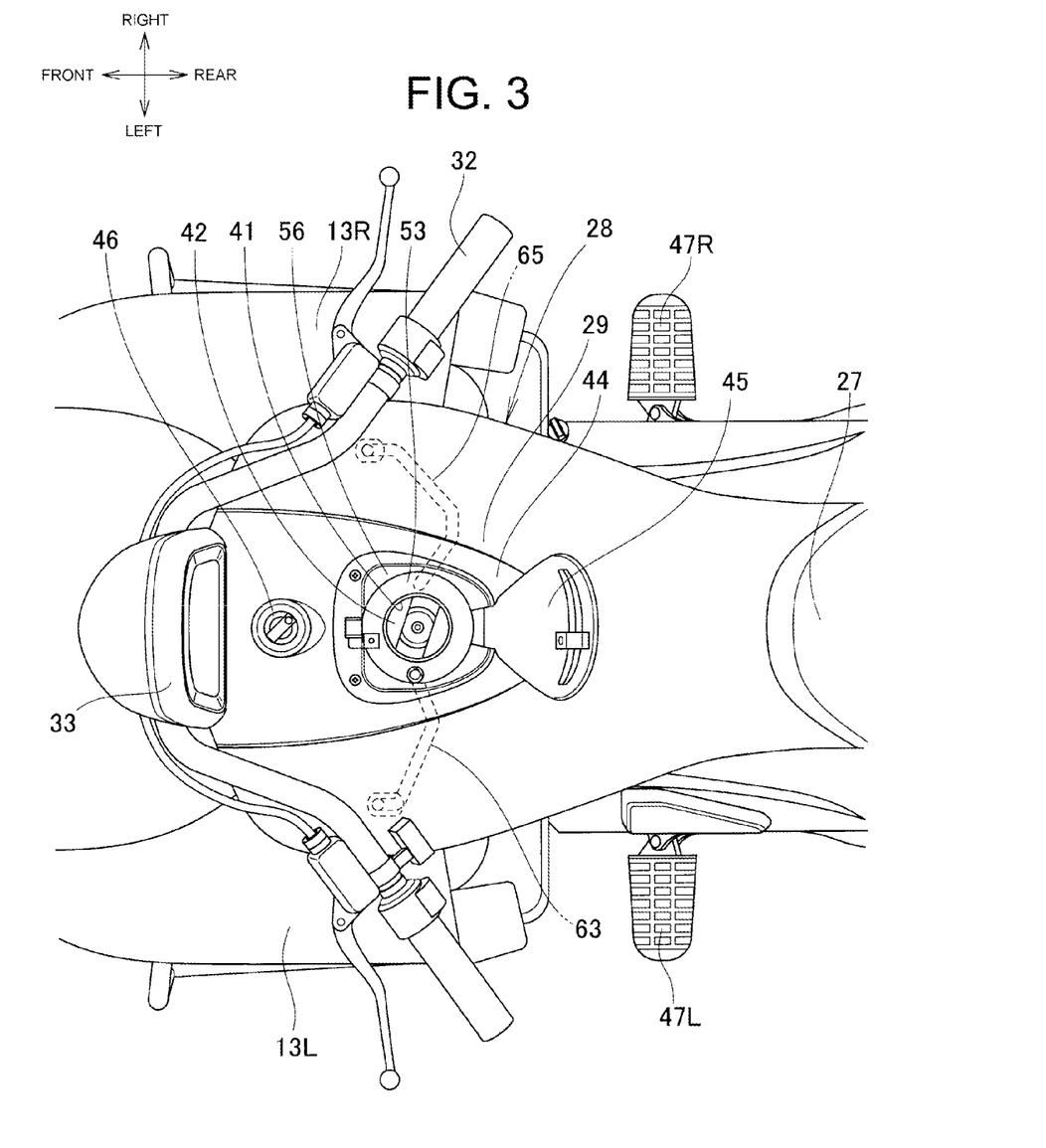
FIG. 3 is a plan view of a fuel tank and portions around the fuel tank.

As shown in FIG. 3, the top cover 44 is mounted on the upper face 29 of the fuel tank 28 in a state where the top cover 44 surrounds the periphery in the horizontal direction of the fuel filler port 41. The fuel filler port 41 is covered with a lid 45 that is mounted on the top cover 44 in an openable and closeable manner. A key cylinder 46 for starting the engine 23 (see FIG. 1) is mounted on the top cover 44 in front of the fuel filler port 41 in the longitudinal direction of the vehicle. In the drawing, symbols 47L, 47R indicate steps on which a rider places his feet.

Next, a drain pipe is explained.

Figure 4:
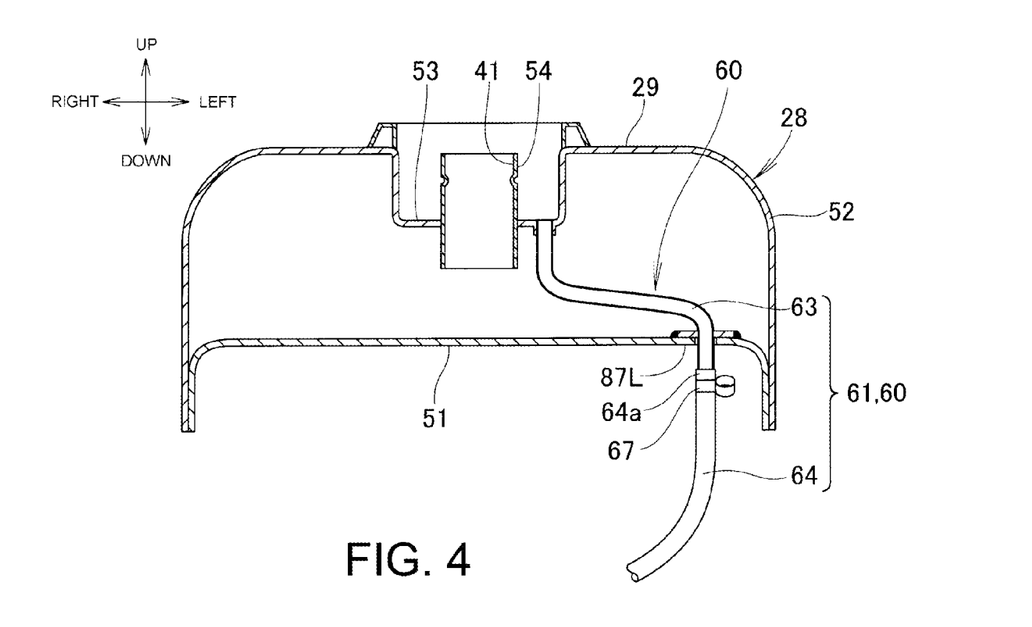
FIG. 4 is a cross-sectional view of a fuel pipe (drain pipe).

As shown in FIG. 4, the fuel tank 28 is constituted of a bottom plate 51, and a tank body 52 that covers the bottom plate 51 from above. A recessed portion 53 is formed on an upper face of the tank body 52, and a cylindrical member 54 is mounted in the recessed portion 53 in a state where the cylindrical member 54 penetrates the recessed portion 53 in the height direction. A fuel filler port 41 is formed of the cylindrical member 54. The recessed portion 53 is formed in a state where the recessed portion 53 surrounds the periphery of the fuel filler port 41, and a fuel pipe 60 extends leftward and rightward in the vehicle width direction from the recessed portion 53. The fuel pipe 60 is a drain pipe 60 through which fuel or rain water accumulated in the recessed portion 53 is discharged to the outside. The drain pipe 61 is constituted of: a first drain pipe 63 that extends downward from the recessed portion 53, extends leftward in the vehicle width direction and, finally, extends downward and projects below the bottom plate 51; and a second drain tube 64 that is connected to a lower end of the first drain pipe 63 and extends downward.

That is, the fuel pipe 60 is the drain pipe 61 through which spilled filling fuel or rain water collected around the fuel filler port is discharged to the outside of the fuel tank 28. Most of the first drain pipe 63 is arranged in the inside of the fuel tank 28, and the second drain tube 64 is arranged outside the fuel tank 28. The first drain pipe 63 is a metal-made pipe, and the second drain tube 64 is formed of a resilient member made of rubber or the like, for example. The second drain tube 64 is inserted into the first drain pipe 63, and a hose band 67 that prevents the removal of the second drain tube 64 is mounted on a fitting portion of the second drain tube 64.

The periphery of the fuel filler port 41 of the fuel tank 28 is covered with the top cover 44 (see FIG. 3). A wall portion 56 formed on the top cover 44 prevents fuel spilled to the recessed portion 53 at the time of supplying fuel from flowing to the periphery of the fuel filler port 41. Fuel, rain water and the like accumulated in the recessed portion 53 are discharged to the outside of the vehicle through the first drain pipe 63 connected to the recessed portion 53 and the second drain tube 64 in this order. Due to such a constitution, it becomes unnecessary to forcibly provide a discharge groove that extends frontward from the fuel filler port 41, for example.

Next, the breather pipe is explained.

Figure 5:
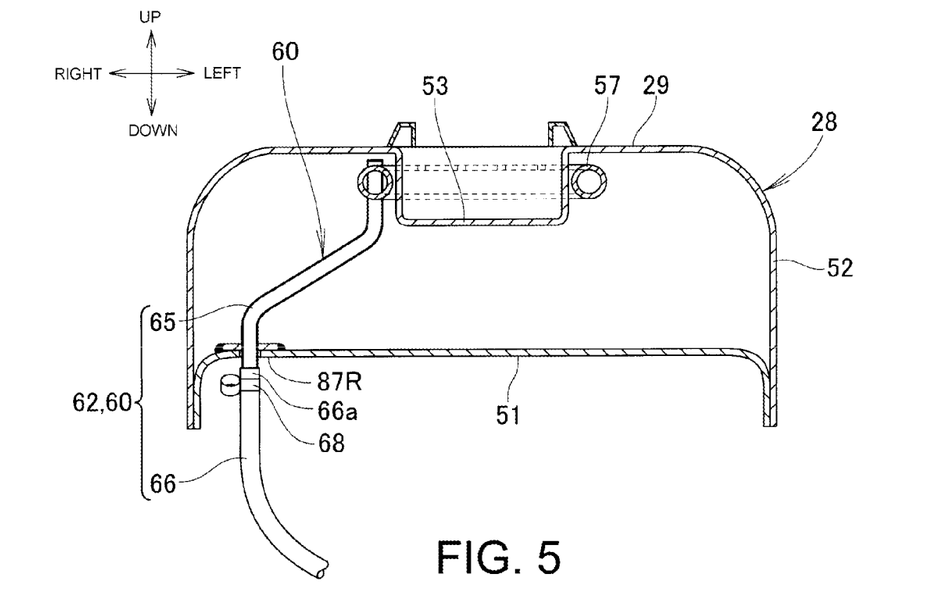
FIG. 5 is a cross-sectional view of a fuel pipe (breather pipe).

As shown in FIG. 5, an arcuate pipe 57 having an arc shape is mounted on the outer periphery of the recessed portion 53 formed on the upper face of the tank body 52. The arcuate pipe 57 is normally positioned above a fuel level. The fuel pipe 60 extends from the arcuate pipe 57. The fuel pipe 60 constitutes a breather pipe 62. The breather pipe 62 is constituted of: a first breather pipe 65 that extends downward from the arcuate pipe 57, extends rightward in the vehicle width direction and, finally, extends downward and projects below the bottom plate 51; and a second breather tube 66 that is connected to a lower end of the first breather pipe 65 and extends downward.

That is, the fuel pipe 60 is the breather pipe 62 which allows the inside of the fuel tank 28 communicate with atmosphere, wherein most of the first breather pipe 65 is arranged inside the fuel tank 28, and the second breather tube 66 is arranged outside the fuel tank 28. The first breather pipe 65 is a metal pipe, and the second breather tube 66 is formed of a resilient member made of rubber or the like, for example. The second breather tube 66 is inserted into the first breather pipe 65, and a hose band 68 that prevents the removal of the second breather tube 66 is mounted on the insertion portion of the second breather tube 66.

With reference to FIG. 4, the fuel pipe 60 is constituted of: the first drain pipe 63 that passes the inside of the fuel tank 28 from an area in the vicinity of the fuel filler port 41; the second drain tube 64 that is connected to a distal end of the first drain pipe 63 and extends downward from a left overhang portion 87L; the first breather pipe 65 that passes the inside of the fuel tank 28 from an area in the vicinity of the fuel filler port 41; and the second breather tube 66 that is connected to a distal end of the first breather pipe 65 and extends downward from a right overhang portion 87R.

Next, the explanation is made with respect to the arrangement of the fuel pipe (the drain pipe 61 and the breather pipe 62) that extends toward the outside of the fuel tank 28 and the like.

Figure 6:
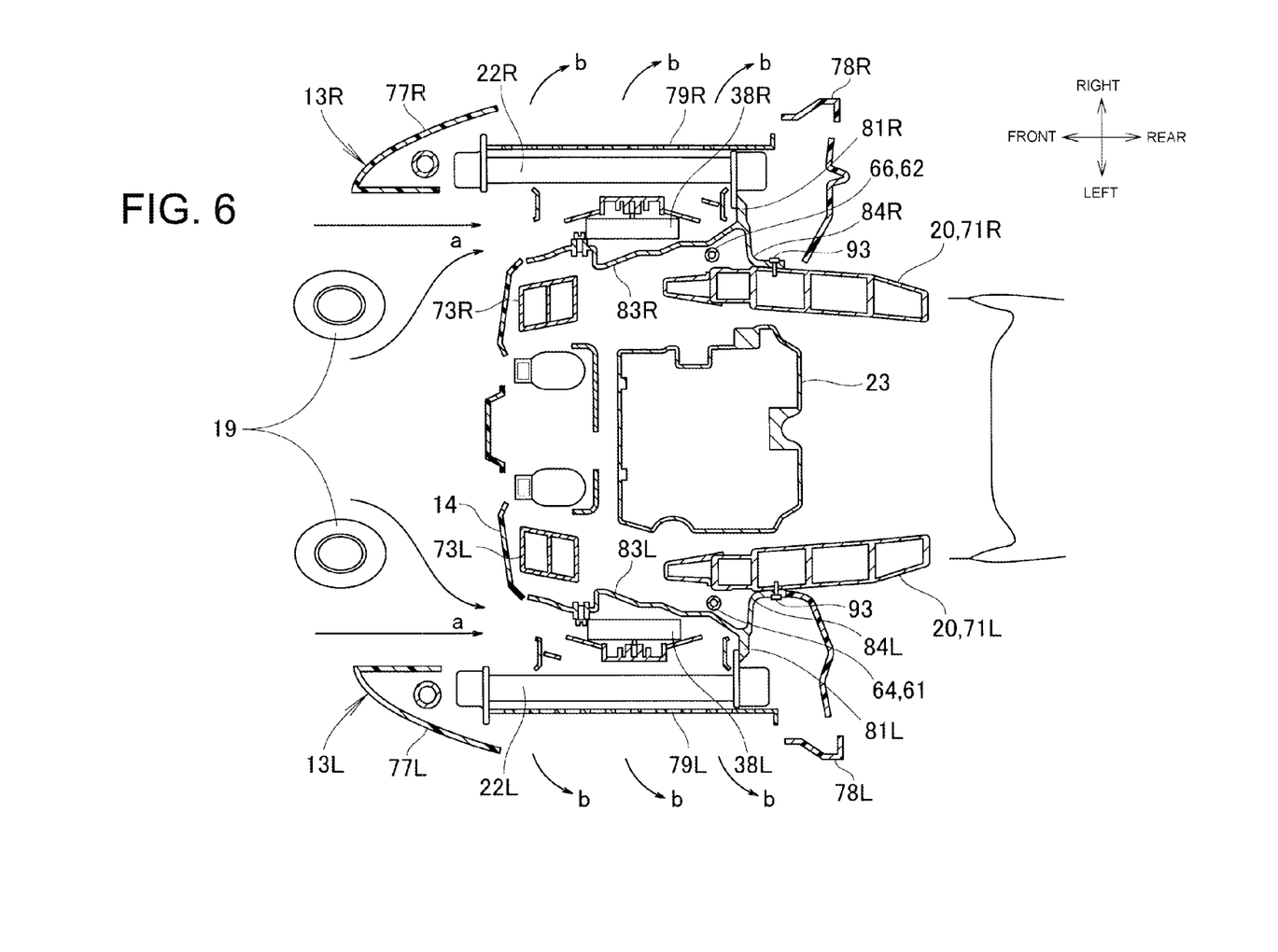
FIG. 6 is a cross-sectional view taken along a line 6-6 in FIG. 1.

As shown in FIG. 6, the engine 23 is arranged between left and right main frames 71L, 71R that form elements of the vehicle body frame 20. Left and right air guides 81L, 81R, which guide a traveling wind to the radiator units 22L, 22R, are mounted on the left and right main frames 71L, 71R, respectively, outside the engine 23 in the vehicle width direction. Left and right cooling fans 38L, 38R are mounted on the left and right air guides 81L, 81R, respectively, from the outside in the vehicle width direction. The left and right side radiator units 22L, 22R, which cool coolant for the engine, are arranged outside the left and right cooling fans 38L, 38R in the vehicle width direction. Radiator grills 79L, 79R are arranged outside the left and right side radiator units 22L, 22R, respectively. The left and right side radiator covers 13L, 13R are arranged on the peripheries of the radiator grills 79L, 79R such that the radiator covers 13L, 13R surround the radiator grills 79L, 79R, respectively.

The left and right side radiator covers 13L, 13R are respectively constituted of: a left or right first radiator cover 77L, 77R, which is arranged in front of the left or right radiator unit 22L, 22R; and left and right second radiator cover 78L, 78R, which is arranged behind the left or right radiator unit 22L, 22R. The left and right side radiator covers 13L, 13R cover the radiator units 22L, 22R and the air guides 81L, 81R, respectively.

The radiator unit is formed of the left and right side radiator units 22L, 22R where cooling air outlets are arranged on the side faces of the vehicle body. The left and right side radiator units 22L, 22R include the left and right air guides 81L, 81R, respectively.

The left and right air guides 81L, 81R respectively include: an air guide body portion 83L, 83R; and a mounting leg portion 84L, 84R, which extends in a leg shape toward the vehicle body frame (left and right main frames 71L, 71R) from the air guide body portions 83L, 83R. The left and right air guides 81L, 81R perform a function of guiding a traveling wind taken from a front side of the vehicle to inner side faces of the left and right side radiator units 22L, 22R.

The manner of operation of the left and right side radiator units 22L, 22R is explained hereafter. A traveling wind is taken from front sides of the left and right air guides 81L, 81R as indicated by arrows "a" in the drawing, passes through the left and right cooling fans 38L, 38R and is guided to the outside of the vehicle as indicated by arrows "b" in the drawing, passes through the left and right side radiator units 22L, 22R, and is discharged to the outside of the vehicle. Due to such an operation, the left and right side radiator units 22L, 22R are cooled.

The drain pipe (second drain tube 64) is positioned by the mounting leg portion 84L of the left air guide 81L, the left main frame 71L, and the left air guide body portion 83L. The second drain tube 64 penetrates an area inside the left radiator cover 13L and outside the left air guide 81L, but not inside the left air guide 81L.

In the same manner, the breather pipe (second breather tube 66) is positioned by the mounting leg portion 84R of the right air guide 81R, the right main frame 71R, and the right air guide body portion 83R. The second breather tube 66 penetrates an area inside the right radiator cover 13R and outside the right air guide 81R, but not inside the right air guide 81R.

The second drain tube 64 and the second breather tube 66 are positioned by the vehicle body frame (main frames 71L, 71R), the air guide body portion 83L, 83R, and the mounting leg portion 84L, 84R, respectively. That is, the second drain tube 64 and the second breather tube 66 can be positioned without using dedicated guide members or the like. Accordingly, an increase in the number of parts can be suppressed.

Next, the vehicle body frame 20 and the like are explained.

Figure 7:
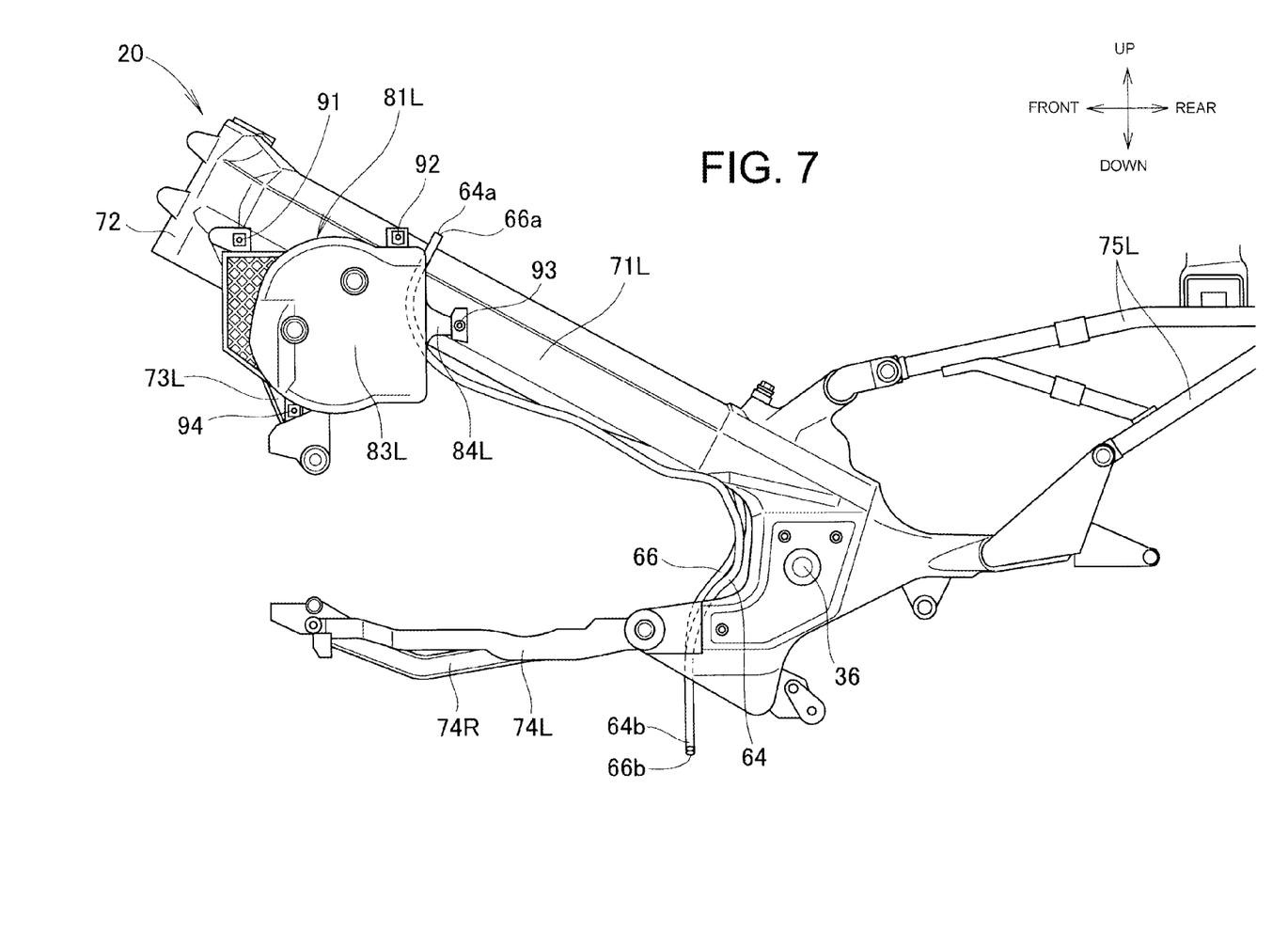
FIG. 7 is a side view for explaining a vehicle body frame and a fuel pipe.

As shown in FIG. 7, the vehicle body frame 20 includes: a head pipe 72, which steerably supports the front wheel steering portion 25 (see FIG. 1); the left and right main frames 71L, 71R (only the main frame 71L on a viewer's side shown in the drawing), which extend obliquely in the rearward and downward direction from the head pipe 72 and supports the engine 23 (see FIG. 1); left and right down frames 73L, 73R (only the down frame 73L on a viewer's side shown in the drawing), which extend obliquely in the rearward and downward direction from the head pipe 72 below the left and right main frames 71L, 71R and from which the engine 23 is suspended; left and right under frames 74L, 74R, which extend frontward in the longitudinal direction of the vehicle from lower ends of rear portions of the left and right main frames 71L, 71R and support the under cover 15 (see FIG. 1); and rear frames 75L, 75R (only the rear frame 75L on a viewer's side shown in the drawing), which extend rearward in the longitudinal direction of the vehicle from rear ends of the left and right main frames 71L, 71R and support the seat (see FIG. 1) and the rear cover 16 (see FIG. 1). In the drawing, the fuel tank is omitted.

The fastening structure of the air guides 81L, 81R (only the air guide 81L on a viewer's side shown in the drawing) is explained. The air guides 81L, 81R are mounted on the left and right main frames 71L, 71R by a first fastening portion 91, a second fastening portion 92, and a third fastening portion 93, respectively, and are mounted on the left and right down frames 73L, 73R by way of a fourth fastening portion 94, respectively.

Next, the explanation is made with respect to the constitution where the fuel pipes, which extend along the outside of the fuel tank 28 project outward from the left and right main frames in the vehicle width direction, respectively.

Figure 8:
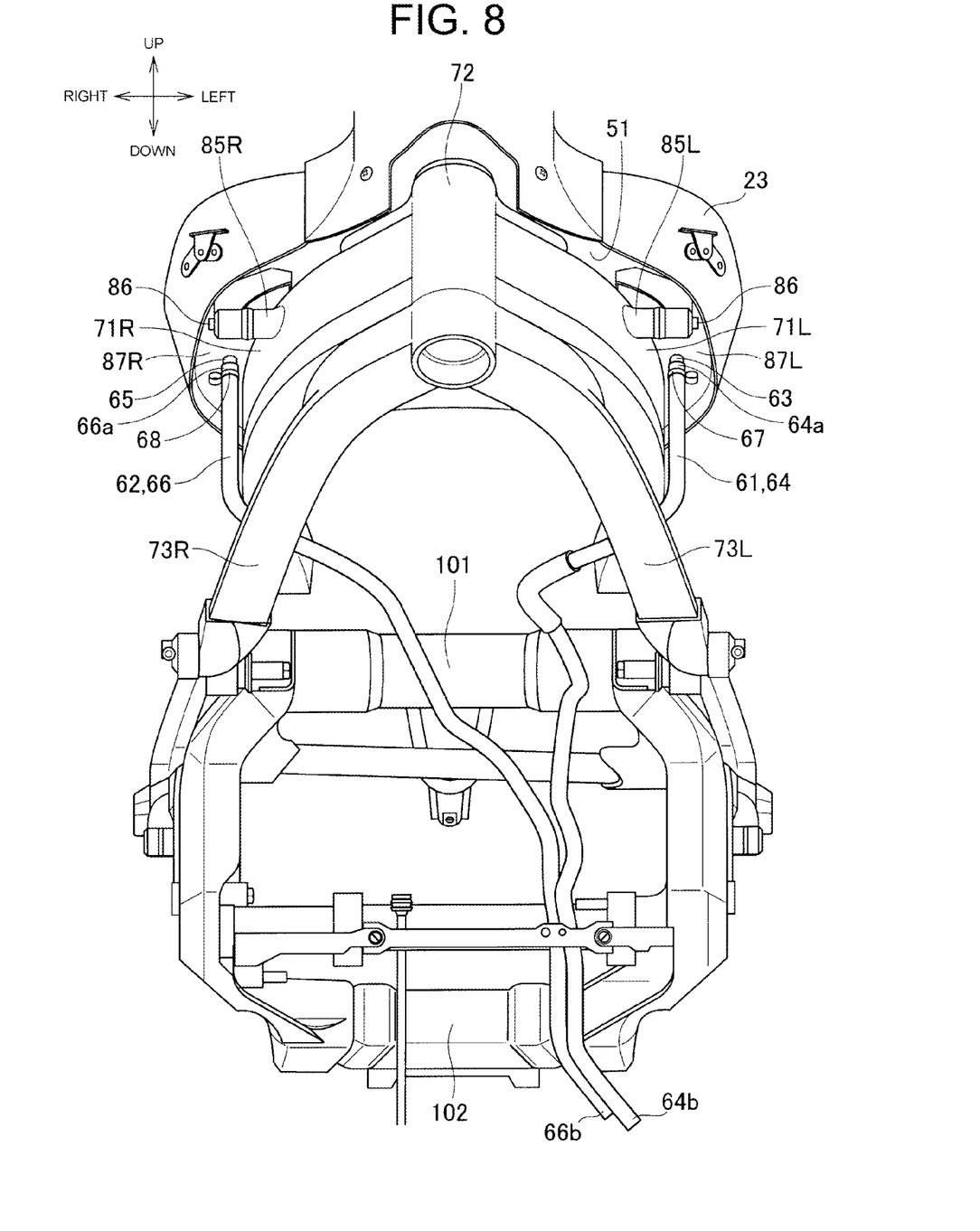
FIG. 8 is a front view for explaining the fuel pipe (showing a state where left and right air guides are omitted).

As shown in FIG. 8, the fuel tank 28 is mounted on left and right mounting brackets 85L, 85R, which are mounted on the left and right main frames 71L, 71R side by fastening members 86, 86, respectively. The bottom plate 51 of the fuel tank 28 includes the left and right overhang portions 87L, 87R that project outward from the left and right main frames 71L, 71R in the vehicle width direction, respectively. The first drain pipe 63 is mounted on the left overhang portion 87L in a downwardly projecting manner, and the second drain tube 64 is connected to a distal end of the first drain pipe 63. The first breather pipe 65 is mounted on the right overhang portion 87R in a downwardly projecting manner, and the second breather tube 66 is connected to a distal end of the first breather pipe 65. In the drawing, symbol 64a indicates an upper end of the second drain tube 64, and symbol 66a indicates an upper end of the second breather tube 66. A lower end 64b of the second drain tube 64 and a lower end 66b of the second breather tube 66 are open to atmosphere.

Figure 9:
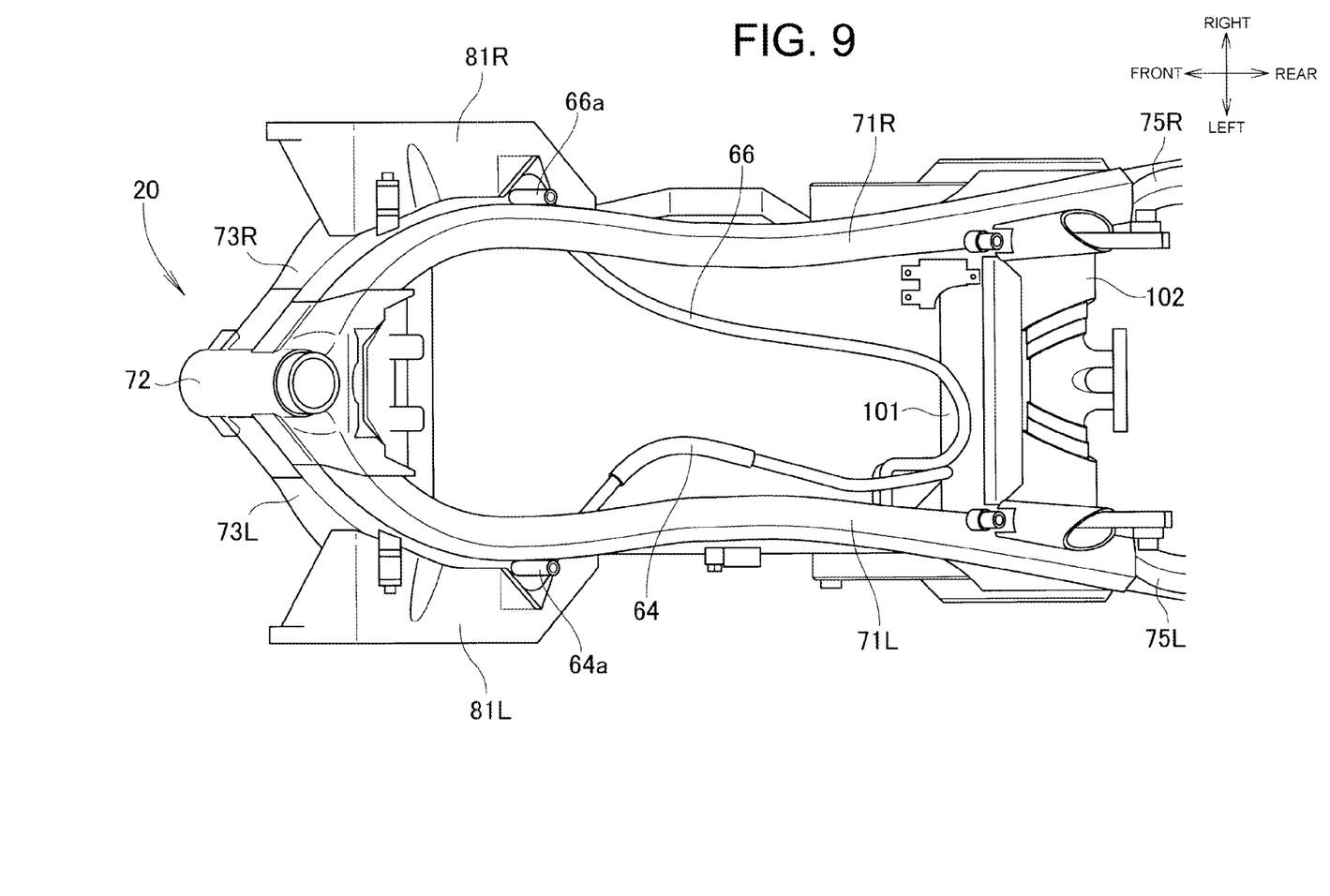
FIG. 9 is a plan view for explaining a fuel pipe arranged outside the fuel tank.

As shown in FIG. 9, the second drain tube 64, which extends rearward in the longitudinal direction of the vehicle on a left side in the vehicle width direction, extends rearward in the longitudinal direction of the vehicle from the upper end 64a on a left side in the vehicle width direction, and the second breather tube 66, which extends rightward in the vehicle width direction, extends rearward in the longitudinal direction of the vehicle from the upper end 66a thereof while moving toward a left side in the vehicle width direction from a right side in the vehicle width direction. In the drawing, the fuel tank, the first drain pipe and the first breather pipe, which are mostly arranged in the inside of the fuel tank, are omitted. A first cross member 101 and a second cross member 102 extend between the main frames 71L, 71R.

The manner of operation of the above-mentioned saddle-ride-type vehicle is described hereinafter.

Returning to FIG. 8, the fuel pipes (the drain pipe 61 and the breather pipe 62) extend to the outside of the fuel tank 28 from the overhang portions 87L, 87R of the fuel tank 28 respectively. The overhang portions 87L, 87R, which project outward from the left and right main frames 71L, 71R in the vehicle width direction, respectively, are regions where the number of parts disposed there is small. The fuel pipes (the drain pipe 61 and the breather pipe 62) extend to the outside of the fuel tank 28 from the left and right overhang portions 87L, 87R, respectively, and hence, compared to the structure where the fuel pipes (the drain pipe 61 and the breather pipe 62) that extend to the outside of the fuel tank 28, are arranged inside the left and right main frames 71L, 71R in the vehicle width direction, respectively, the operability relating to the mounting or the removal of the fuel pipes can be enhanced.

With reference to FIG. 2 and FIG. 6, the fuel pipes (the drain pipe 61 and the breather pipe 62) pass the inside (inner portion) of the fuel tank 28 from an area in the vicinity of the fuel filler port 41 and go out from the fuel tank 28. At the positions where the drain pipe 61 and the breather pipe 62 go out from the fuel tank 28, the drain pipe 61 and the breather pipe 62 are covered with the vehicle body cover (radiator covers 13L, 13R) from the lateral sides, respectively.

That is, the fuel pipes (the drain pipe 61 and the breather pipe 62), which extend to the outside of the fuel tank 28 from the left and right overhang portions 87L, 87R, are respectively arranged at positions concealed by the vehicle body cover (radiator covers 13L, 13R) and hence, there is no possibility that appearance of the vehicle is impaired.

For imparting predetermined cooling property to the radiator units 22L, 22R, the peripheries of the radiator covers 13L, 13R, which are constitutional elements of the cover for covering the lateral sides of the vehicle body, are regions where the number of parts disposed there is small. That is, the fuel pipes 60 are respectively arranged on the peripheries of the radiator covers 13L, 13R where the number of parts disposed there is small. Accordingly, the detachability of the fuel pipes 60 extending toward the outside of the fuel tank 28 from the left and right overhang portions 87L, 87R can be further enhanced.

The drain pipe 61 and the breather pipe 62 penetrate the areas inside the left and right side radiator covers 13L, 13R and the areas outside the left and right air guides 81L, 81R respectively. By arranging the drain pipe 61 and the breather pipe 62 outside the left and right air guides 81L, 81R respectively, the drain pipe 61 and the breather pipe 62 are hardly influenced by heat from the radiator units 22L, 22R. As a result, maintenance property of the pipes is not impaired and, at the same time, the pipes are hardly influenced by heat from the left and right side radiator units 22L, 22R.

In the illustrated and preferred embodiment, the drain pipe 61 and the breather pipe 62 penetrate the areas inside the left and right side radiator covers 13L, 13R and outside the left and right air guides 81L, 81R, respectively. However, there is no problem when either one of the drain pipe 61 or the breather pipe 62 penetrates the area inside the radiator cover 13L, 13R and outside the air guide 81L, 81R.

Returning to FIG. 3 and FIG. 4, the fuel pipe is the drain pipe 61 through which spilled filling fuel or rain water collected around the fuel filler port is discharged to the outside of the fuel tank. With respect to the first drain pipe 63, which is arranged in the inside of the fuel tank 28, in the case where the fuel filler port 41 is arranged on a front side of the fuel tank 28 in the longitudinal direction of the fuel tank 28, compared to the structure where the drain pipe extends in the longitudinal direction of the vehicle from the periphery of the fuel filler port 41 in the inside of the fuel tank 28, the first drain pipe 63 extends outward from the periphery of the fuel filler port 41 in the vehicle width direction in the inside of the fuel tank 28 and hence, a pipe length of the first drain pipe 63 in the inside of the fuel tank 28 can be shortened.

Returning to FIG. 3 and FIG. 5, the fuel pipe is the breather pipe 62 that makes the inside of the fuel tank 28 communicate with atmosphere. With respect to the first breather pipe 65 arranged in the inside of the fuel tank 28, in the case where the fuel filler port 41 is arranged on a front side of the fuel tank 28 in the longitudinal direction of the fuel tank 28, compared to the structure where the breather pipe extends in the longitudinal direction of the vehicle from the periphery of the fuel filler port 41 in the inside of the fuel tank 28, the first breather pipe 65 extends outward from the periphery of the fuel filler port in the vehicle width direction in the inside of the fuel tank 28 and hence, a pipe length of the first breather pipe 65 in the inside of the fuel tank 28 can be shortened.

Next, the explanation is made with respect to an example where a canister is connected to a downstream end of the breather pipe.

Figure 10:
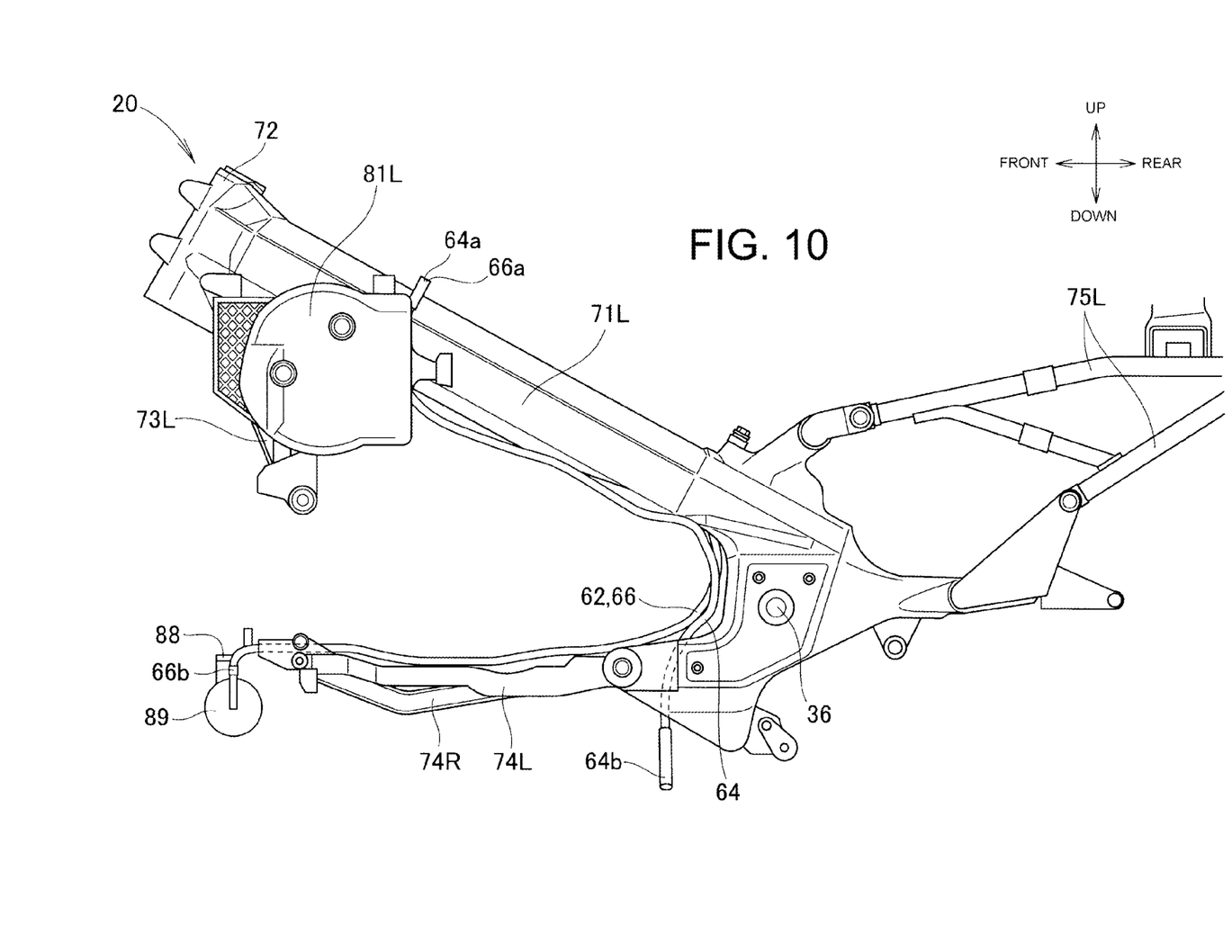
FIG. 10 is a view showing another embodiment of the vehicle body frame and the fuel pipe shown in FIG. 7.

As shown in FIG. 10, a canister 89, which prevents discharging of an evaporated fuel into atmosphere, is provided to a downstream end of the second breather tube 66. That is, the canister 89 is connected to a distal end of the breather pipe 62. The canister 89 is mounted on a bracket 88 mounted on a lower end of the engine 23. The second breather tube 66 can be easily mounted on or removed from a fuel tank 28 side and hence, the degree of freedom in arrangement of the canister 89 can be largely enhanced.

The other constitutions of this example do not largely differ from the constitutions shown in FIG. 7 and hence, the explanation of other constitutions is omitted.

Although the invention is applied to a motorcycle in the embodiment, the invention is also applicable to a saddle-ride-type three-wheeled vehicle, and there is no problem in applying the invention to the saddle-ride-type vehicles in general.

DESCRIPTION OF REFERENCE NUMERALS

10: saddle-ride-type vehicle (motorcycle)
11: vehicle body cover
13L, 13R: vehicle body cover (radiator cover)
17: front wheel
20: vehicle body frame
22L, 22R: radiator unit (side radiator unit)
23: engine
27: seat
28: fuel tank
41: fuel filler port
61: drain pipe
62: breather pipe
71L, 71R: pair of left and right main frames
72: head pipe
81L, 81R: air guide
83L, 83R: air guide body portion
84L, 84R: mounting leg portion
87L, 87R: overhang portion
89: canister

What is claimed is:

1. A saddle-ride-type vehicle where the vehicle includes a head pipe that steerably supports a front wheel and left and right main frames that extend obliquely in a downward and rearward direction from the head pipe, an engine is supported between and on lower sides of the left and right main frames, a vehicle body frame supports a seat on which a rider may be seated in a straddling manner, said seat being provided behind and above the engine, and a fuel tank, which is arranged above the vehicle body frame, supplies fuel to the engine, wherein
the fuel tank includes overhang portions that project outward from the left and right main frames in a vehicle width direction, and a fuel pipe passes the inside of the fuel tank from an area in the vicinity of a fuel filler port, and extends downward from the overhang portion.

2. The saddle-ride-type vehicle according to claim 1, wherein vehicle body covers, which cover lateral side faces of a vehicle body, extend downward from lateral side faces of the fuel tank, and
the fuel pipe extends downward from the overhang portion at a position concealed by the vehicle body cover as viewed in a side view of the vehicle.

3. The saddle-ride-type vehicle according to claim 1, wherein the fuel pipe is a drain pipe through which spilled filling fuel or rain water collected around the fuel filler port is discharged to the outside of the fuel tank.

4. The saddle-ride-type vehicle according to claim 1, wherein the fuel pipe is a breather pipe which makes the inside of the fuel tank and atmosphere communicate with each other.

5. The saddle-ride-type vehicle according to claim 4, wherein the fuel tank includes a canister which prevents discharging of an evaporated fuel into atmosphere, and
the canister is connected to a distal end of the breather pipe.

6. The saddle-ride-type vehicle according to claim 1, wherein vehicle body covers are radiator covers which cover a radiator unit which cools coolant for the engine.

7. The saddle-ride-type vehicle according to claim 6, wherein the radiator unit is constituted of side radiator units where cooling air outlets are arranged on side faces of the vehicle body,
the side radiator units include air guides which guide a traveling wind taken from a front side of the vehicle to inner side faces of the side radiator units,
the radiator covers cover the radiator units and the air guides, and
the drain pipe and/or the breather pipe penetrate/penetrates an area inside the radiator cover and outside the air guide.

8. The saddle-ride-type vehicle according to claim 7, wherein the air guide includes an air guide body portion, and a mounting leg portion which extends in a leg shape toward the vehicle body frame from the air guide body portion, and
the drain pipe and/or the breather pipe are/is positioned by the vehicle body frame, the air guide body portion and the mounting leg portion as viewed in a plan view.

9. The saddle-ride-type vehicle according to claim 2, wherein the fuel pipe is a drain pipe through which spilled filling fuel or rain water collected around the fuel filler port is discharged to the outside of the fuel tank.

10. The saddle-ride-type vehicle according to claim 2, wherein the fuel pipe is a breather pipe which makes the inside of the fuel tank and atmosphere communicate with each other.

11. The saddle-ride-type vehicle according to claim 10, wherein the fuel tank includes a canister which prevents discharging of an evaporated fuel into atmosphere, and
the canister is connected to a distal end of the breather pipe.

12. The saddle-ride-type vehicle according to claim 2, wherein the vehicle body covers are radiator covers which cover a radiator unit which cools coolant for the engine.

13. The saddle-ride-type vehicle according to claim 12, wherein the radiator unit is constituted of side radiator units where cooling air outlets are arranged on side faces of the vehicle body,
the side radiator units include air guides which guide a traveling wind taken from a front side of the vehicle to inner side faces of the side radiator units,
the radiator covers cover the radiator units and the air guides, and
the drain pipe and/or the breather pipe penetrate/penetrates an area inside the radiator cover and outside the air guide.

14. The saddle-ride-type vehicle according to claim 13, wherein the air guide includes an air guide body portion, and a mounting leg portion which extends in a leg shape toward the vehicle body frame from the air guide body portion, and the drain pipe and/or the breather pipe are/is positioned by the vehicle body frame, the air guide body portion and the mounting leg portion as viewed in a plan view.

15. The saddle-ride-type vehicle according to claim 3, wherein vehicle body covers are radiator covers which cover a radiator unit which cools coolant for the engine.

16. The saddle-ride-type vehicle according to claim 15, wherein the radiator unit is constituted of side radiator units where cooling air outlets are arranged on side faces of the vehicle body, the side radiator units include air guides which guide a traveling wind taken from a front side of the vehicle to inner side faces of the side radiator units, the radiator covers cover the radiator units and the air guides, and the drain pipe and/or the breather pipe penetrate/penetrates an area inside the radiator cover and outside the air guide.

17. The saddle-ride-type vehicle according to claim 16, wherein the air guide includes an air guide body portion, and a mounting leg portion which extends in a leg shape toward the vehicle body frame from the air guide body portion, and the drain pipe and/or the breather pipe are/is positioned by the vehicle body frame, the air guide body portion and the mounting leg portion as viewed in a plan view.

18. The saddle-ride-type vehicle according to claim 4, wherein vehicle body covers are radiator covers which cover a radiator unit which cools coolant for the engine.

19. The saddle-ride-type vehicle according to claim 18, wherein the radiator unit is constituted of side radiator units where cooling air outlets are arranged on side faces of the vehicle body, the side radiator units include air guides which guide a traveling wind taken from a front side of the vehicle to inner side faces of the side radiator units, the radiator covers cover the radiator units and the air guides, and the drain pipe and/or the breather pipe penetrate/penetrates an area inside the radiator cover and outside the air guide.

20. The saddle-ride-type vehicle according to claim 19, wherein the air guide includes an air guide body portion, and a mounting leg portion which extends in a leg shape toward the vehicle body frame from the air guide body portion, and the drain pipe and/or the breather pipe are/is positioned by the vehicle body frame, the air guide body portion and the mounting leg portion as viewed in a plan view.

* * * * *